UNITED STATES PATENT OFFICE.

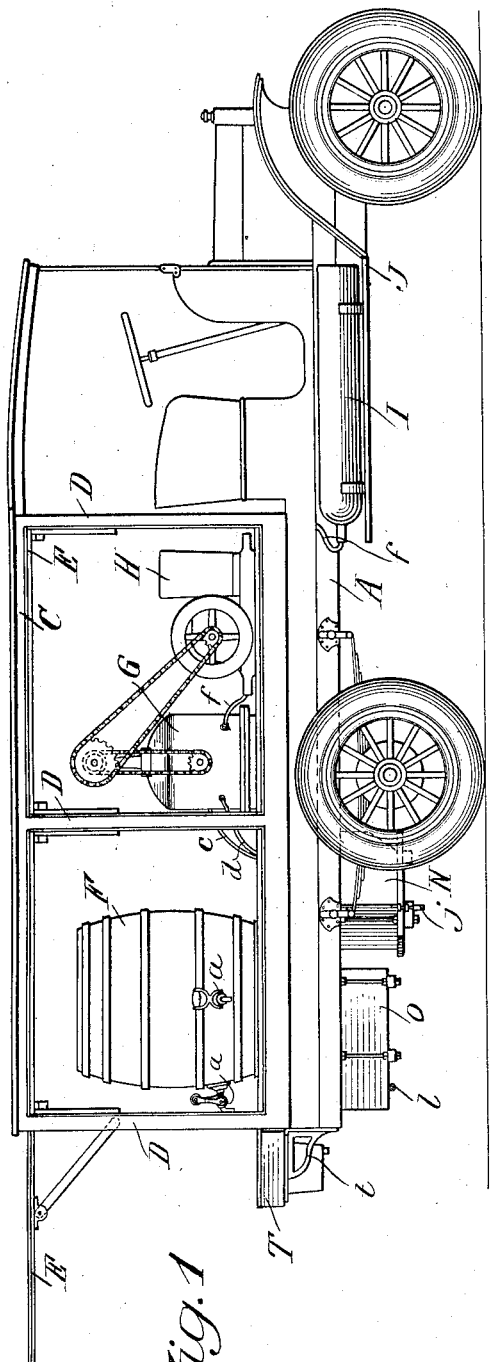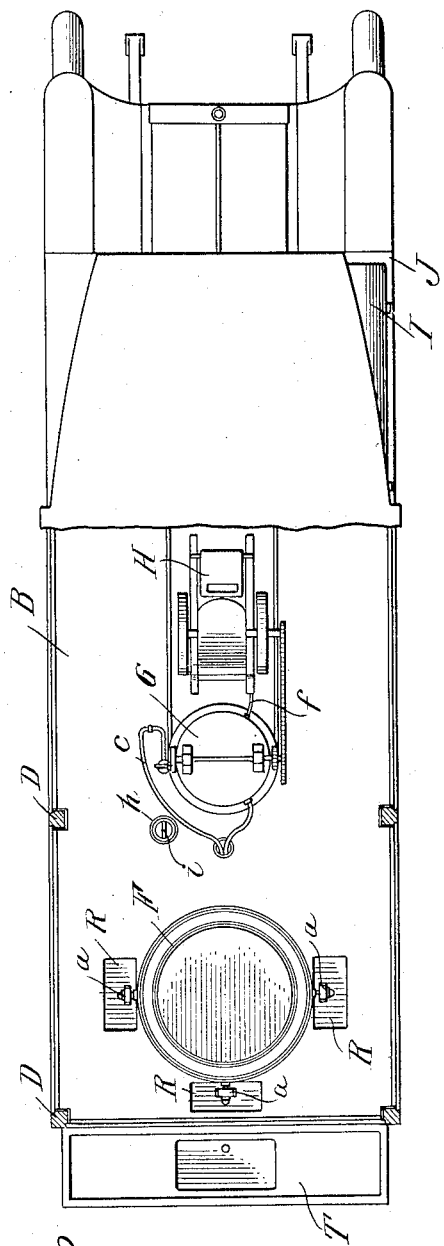

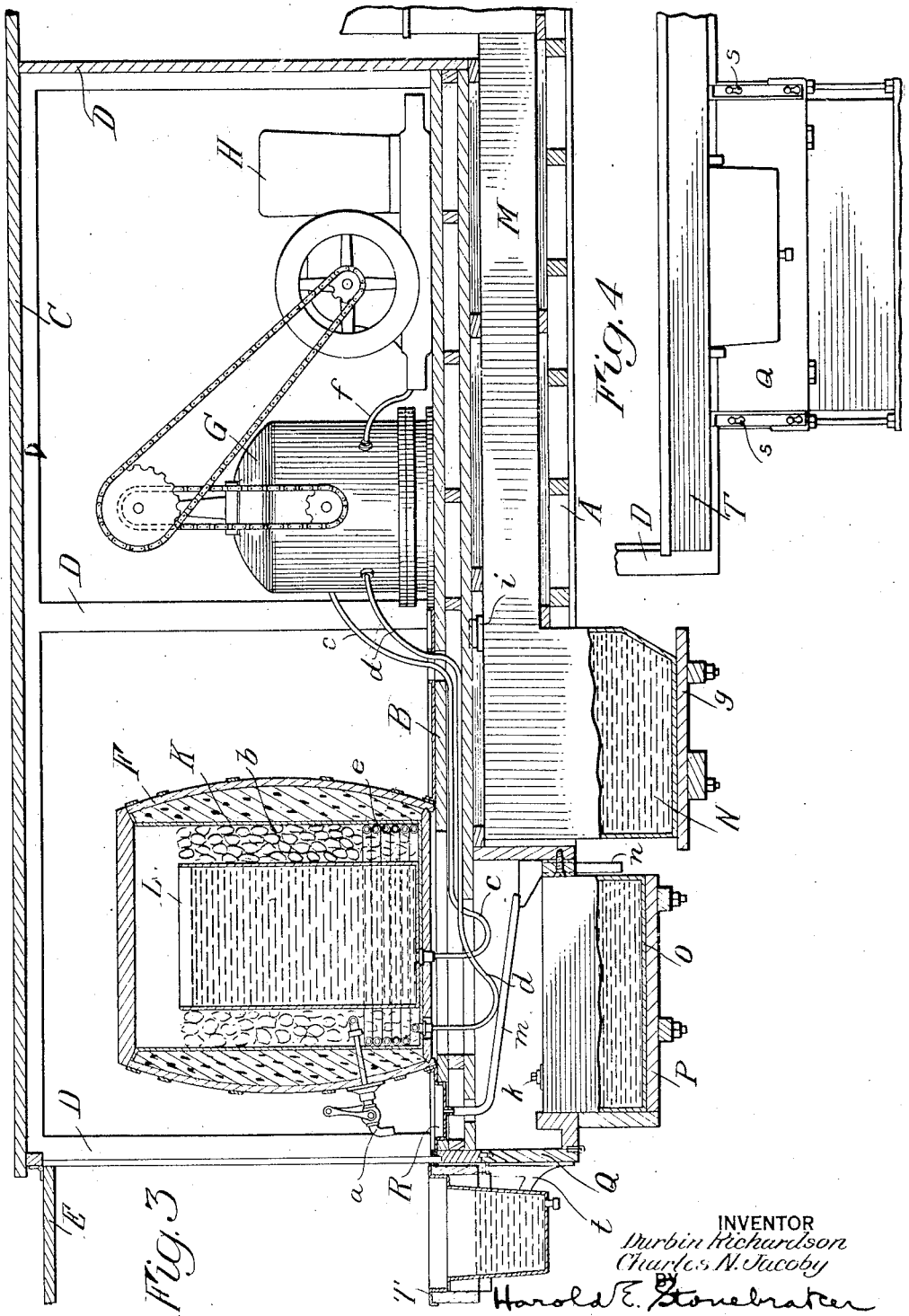

DURBIN RICHARDSON AND CHARLES N. JACOBY, OF ROCHESTER, NEW YORK, ASSIGNORS TO RICHARDSON CORPORATION, OF ROCHESTER, NEW YORK, A CORPORATION OF NEW YORK.

PORTABLE BEVERAGE-DISPENSING APPARATUS.

1,352,475.  Specification of Letters Patent.  Patented Sept. 14, 1920.

Application filed August 28, 1919. Serial No. 320,449.

*To all whom it may concern:*

Be it known that we, DURBIN RICHARDSON and CHARLES N. JACOBY, citizens of the United States of America, residing in Rochester, county of Monroe, and State of New York, have invented certain new and useful Improvements in Portable Beverage-Dispensing Apparatus, of which the following is a specification.

Our invention has for its primary purpose to afford a portable beverage dispensing apparatus, adaptable to an automobile or other vehicle, which can be moved from place to place while possessing facilities for serving a beverage as quickly and efficiently as from the ordinary stationary dispenser.

A further object of the invention is to provide for serving carbonated beverages, such as root beer, ginger ale, and other drinks, in large quantities from a portable apparatus.

An additional purpose is to arrange the parts compactly and for convenient access, and so that the floor of the vehicle can serve as a counter while all the necessary constituent elements of the beverage can be conveniently stored on the vehicle, ready for immediate use.

The invention also consists in various other novel features, which will be clear from the following detailed description, and the accompanying drawings, in conjunction with the claims at the end of the specification.

In the drawings:

Figure 1 is a side elevation illustrating a practical and preferred embodiment of the invention;

Fig. 2 is a plan view with a portion of the top broken away;

Fig. 3 is a longitudinal vertical sectional view taken centrally, with parts appearing in elevation, and Fig. 4 is a rear end elevation, partially broken away.

Referring more particularly to the drawings, A designates the chassis or frame of an automobile truck or other vehicle, provided with the floor B and top C, the latter being mounted on vertical posts or standards D and provided with vertically swinging doors E by means of which the vehicle can be closed when the dispensing apparatus is not in operation.

The dispensing apparatus is preferably supported and secured upon the floor B, although it may be otherwise mounted on the vehicle, and comprises a dispensing device F, a carbonating mechanism G and a pump H for driving the carbonating mechanism, while I is a tank of carbonic acid gas which is mounted on the running board J and connected to the carbonating mechanism G for a purpose which will presently appear.

The dispensing device F includes a container K upon which are arranged one or more discharge faucets $a$, the dispensing device being positioned at the rear end of the vehicle, intermediate the sides, so that the respective discharge faucets are accessible from alongside the rear and sides of the vehicle. Within the container K is a liquid or syrup chamber L, spaced therefrom to afford an ice compartment $b$. The syrup chamber L has an opening in the bottom from which leads a conducting pipe $c$ to the carbonating mechanism G while $d$ designates a conducting pipe leading from the carbonating mechanism to a coil $e$ within the ice compartment $b$, which communicates with the discharge faucets $a$. The carbonating mechanism G may be of any standard type, its function being to receive the beverage syrup and mix it with a suitable proportion of carbonic acid gas, supplied from the tank I through a pipe $f$, thence forcing the charged beverage through the pipe $d$ and the container K to the discharge faucets.

For the purposes of a portable beverage dispensing apparatus it is essential to carry a supply of water and syrup for making the beverage, the mixture of water and syrup being placed in the syrup chamber L. To accomplish this, an arrangement is provided for storing a maximum amount of water, without using any of the floor space of the vehicle, and without disturbing the proper distribution of weight throughout the vehicle. The water tank comprises a wide relatively shallow portion M extending lengthwise of the vehicle, and arranged between the chassis A and the floor B. The water tank preferably extends approximately from one side of the chassis A to the other, being supported thereon, and at the rear end of the shallow portion M is a relatively deep portion N, the bottom of which rests upon a supporting frame g which is suitably suspended from the chassis. The floor B is provided with an opening h through which access is had to the tank M for filling, for which purpose the closure i is removable. Water is drawn from the bottom of the tank, when needed, through the draw-off faucet j.

A syrup receptacle is disposed in rear of the water tank, and in spaced relation beneath the floor of the vehicle, as designated by O. The syrup receptacle O is mounted on a supporting frame P, and is adapted to be filled by removing the closure k, syrup being drawn off at the bottom through a faucet l. The syrup receptacle is accessible at the top, from the rear of the vehicle, the space above the container being reached by opening the swinging door Q. R designates a drip pan from which a pipe m leads to a drain n, the latter discharging beneath the vehicle.

When the dispensing apparatus is in use, it is desirable to provide for convenient washing of glasses, and to this end, there is provided a tray and wash tank, designated generally by T. Attached to the tray T are brackets t, which are slotted at s to engage bolts on the vehicle, whereby the tray can be readily secured in or removed from operating position.

It is to be understood that the invention is not confined to the particular construction here disclosed; since various changes may be made without departing from the underlying features of the improvements, or the intended scope of the following claims:

1. In a beverage dispensing apparatus, the combination with a container, of a discharge faucet on the container, a liquid chamber within the container and having an opening in the bottom, carbonating mechanism, a conducting pipe leading from said opening in the bottom of said chamber through the bottom of the container to the carbonating mechanism, and a conducting pipe leading from the carbonating mechanism through the bottom of the container and through said container to the discharge faucet.

2. In a beverage dispensing apparatus the combination with the floor of a vehicle, of a water tank supported under the floor, said tank including a wide, relatively shallow portion extending lengthwise of the vehicle.

3. In a beverage dispensing apparatus, the combination with the floor of a vehicle, of a water tank supported under the floor, said tank including a wide, relatively shallow portion extending lengthwise of the vehicle, and a relatively deep portion extending downwardly at the rear end of the shallow portion.

4. In a beverage dispensing apparatus, the combination with the floor of a vehicle, of a water tank supported under the floor, said tank including a wide, relatively shallow portion extending lengthwise of the vehicle, and a relatively deep portion extending downwardly at the rear end of the shallow portion, the floor having an opening and the tank having a filling opening under said floor opening, and a draw-off faucet at the bottom of said deep portion of the tank.

In witness whereof, we have hereunto signed our names.

DURBIN RICHARDSON.
CHARLES N. JACOBY.